United States Patent
Thillen et al.

(10) Patent No.: US 8,920,710 B2
(45) Date of Patent: *Dec. 30, 2014

(54) DEVICE FOR DISTRIBUTING CHARGE MATERIAL INTO A SHAFT FURNACE

(75) Inventors: Guy Thillen, Diekirch (LU); Emile Lonardi, Bascharage (LU); Lionel Hausemer, Steinsel (LU); Christian Benoit Thix, Luxembourg (LU)

(73) Assignee: Paul Wurth S.A. (LU)

( * ) Notice: Subject to any disclaimer, the term of this patent is extended or adjusted under 35 U.S.C. 154(b) by 289 days.

This patent is subject to a terminal disclaimer.

(21) Appl. No.: 13/322,992

(22) PCT Filed: Jun. 3, 2010

(86) PCT No.: PCT/EP2010/057784
§ 371 (c)(1),
(2), (4) Date: Nov. 29, 2011

(87) PCT Pub. No.: WO2010/139761
PCT Pub. Date: Dec. 9, 2010

(65) Prior Publication Data
US 2012/0068392 A1    Mar. 22, 2012

(30) Foreign Application Priority Data
Jun. 5, 2009   (LU) .......................................... 91576

(51) Int. Cl.
*F27B 1/24*    (2006.01)
*C21B 7/20*    (2006.01)
*F27B 1/20*    (2006.01)
*F27D 3/10*    (2006.01)
*F16H 37/08*   (2006.01)

(52) U.S. Cl.
CPC ... *C21B 7/20* (2013.01); *F27B 1/20* (2013.01); *F27D 3/10* (2013.01); *F16H 37/0806* (2013.01)
USPC .......................................... 266/199; 266/197

(58) Field of Classification Search
CPC ....................................................... C21B 7/20
USPC ......................................... 266/184, 197, 199
See application file for complete search history.

(56) References Cited

U.S. PATENT DOCUMENTS 3,693,812 A   9/1972 Mahr
4,941,792 A   7/1990 Cimenti
(Continued)

FOREIGN PATENT DOCUMENTS

CN   101476005 A   7/2009
JP   6396205       4/1988
(Continued)

OTHER PUBLICATIONS

International Search Report PCT/EP2010/057784; Dated Sep. 27, 2010.
(Continued)

*Primary Examiner* — Scott Kastler
(74) *Attorney, Agent, or Firm* — Cantor Colburn LLP

(57) ABSTRACT

A shaft furnace charge material distribution device includes a main housing, a distribution chute, a suspension rotor and an adjustment rotor, which are rotatable about a vertical axis. The chute is suspended to the suspension rotor to rotate therewith for circumferential distribution of charge material and is adjustable in orientation for radial distribution of charge material. A differential gear interconnects the suspension rotor and adjustment rotor and is configured to transmit to the adjustment rotor the same speed of rotation that is imparted to the suspension rotor by a main rotation drive unless an adjustment drive imparts differential rotation to the adjustment rotor. The device includes two gear casings arranged on the main housing and a shaft arrangement. The first gear encloses a gear mechanism connecting the main rotation drive to one output shaft. The second gear casing encloses the differential gear connecting the adjustment drive to another output shaft.

20 Claims, 4 Drawing Sheets

(56) References Cited

U.S. PATENT DOCUMENTS

| | | | |
|---|---|---|---|
| 5,002,806 A | 3/1991 | Chung | |
| 5,433,667 A * | 7/1995 | Schafer et al. | 464/118 |
| 2003/0180129 A1 | 9/2003 | Lonardi | |
| 2012/0068392 A1* | 3/2012 | Thillen et al. | 266/200 |
| 2012/0070253 A1* | 3/2012 | Thillen et al. | 414/199 |

FOREIGN PATENT DOCUMENTS

| | | | |
|---|---|---|---|
| JP | 02022409 A | | 1/1990 |
| LU | 59207 A1 | | 12/1969 |
| SU | 1452843 A1 | | 1/1989 |
| SU | 1669988 A1 | | 8/1991 |
| WO | 0063587 A1 | | 10/2000 |

OTHER PUBLICATIONS

International Preliminary Report on Patentability, PCT/EP2010/057784, Sep. 16, 2011.

J.A. Collins, et al., "Mechanical Design of Machine Elements and Machines, a Failure Prevention Perspective", Chapter 8, pp. 341-381.

* cited by examiner

DEVICE FOR DISTRIBUTING CHARGE MATERIAL INTO A SHAFT FURNACE

TECHNICAL FIELD

The present invention generally relates to a charging installation for a shaft furnace and in particular to a distribution device equipped with a chute for circumferential and radial distribution of charge material into the furnace. More specifically, the invention relates to the driving system for operating the chute in this type of device.

BRIEF DISCUSSION OF RELATED ART

A device for distributing charge material into a shaft furnace is known from U.S. Pat. No. 3,693,812. The device according to U.S. Pat. No. 3,693,812 has a suspension rotor and a chute adjustment rotor that are supported in a main housing so as to be rotatable about a substantially vertical rotation axis, which typically corresponds to the furnace axis. In typical manner, the chute is suspended to the suspension rotor so that it rotates with the latter for circumferential distribution of charge material. Furthermore, in the device according to U.S. Pat. No. 3,693,812, the chute is suspended to be pivotally adjustable about a substantially horizontal axis for radial distribution of charge material. The suspension rotor and the adjustment rotor are driven by a differential drive unit that is equipped with a main rotation drive, namely an electric motor, and an adjustment drive, namely an electric motor. The latter allows creating differential rotation between the suspension rotor and the adjustment rotor. In the device according to U.S. Pat. No. 3,693,812, a pivoting mechanism is provided for adjustment of the chute. This mechanism, which connects the chute to the adjustment rotor and which is actuated by means of the adjustment rotor, transforms a variation in angular displacement between the suspension rotor and the adjustment rotor due to differential rotation into a variation of the pivotal position i.e. the tilt angle of the chute between two limit positions.

The device for distributing charge material according to U.S. Pat. No. 3,693,812 is equipped with a compact drive unit for driving the two rotors as illustrated in annexed FIG. 1. This unit is enclosed in a gear casing 1 arranged on top of the main housing that supports the rotors and the chute. The gear casing 1 has a primary input shaft 2; a secondary input shaft 3; a first output shaft 4, hereinafter called rotation shaft; and a second output shaft 5, hereinafter called adjustment shaft. The primary input shaft 2 is driven by the main rotation drive 6. Inside the gear casing, a reduction mechanism 7 connects the primary input shaft 2 to the rotation shaft 4, which extends vertically inside the main housing where it is provided with a gearwheel that meshes with a gear ring of the suspension rotor. The adjustment shaft 5 also extends vertically into the main housing where it is provided with a gearwheel that meshes with a gear ring of the adjustment rotor. Inside the gear casing of the drive unit, the rotation shaft 4 and the adjustment shaft 5 are interconnected by means of an epicyclic differential gear, i.e. a sun-and-planet gear train 8. The latter mainly comprises a horizontal annulus (ring gear) that has external teeth meshing with a gearwheel on the rotation shaft 4; a sun gear that is connected to the secondary input shaft 3 and a planet gear carrier with at least two planet gears that mesh with internal teeth of the annulus and with the sun gear. As seen in FIG. 1, the planet gear carrier drives the adjustment shaft 5 through an intermediate gear.

This sun-and-planet gear train 8 of FIG. 1 forms a differential mechanism, which is an essential component of a distribution device of the rotatable-and-pivotable-chute type according to U.S. Pat. No. 3,693,812. The differential mechanism 8 is dimensioned so that the rotation shaft 4 and the adjustment shaft 5 rotate synchronously, i.e. have the same rotational speed imparted by the main rotation drive 6, whenever the secondary input shaft 3 is stationary, i.e. when the adjustment drive 9 connected to the secondary input shaft 3 is at stop. By virtue of the differential mechanism 8, the adjustment drive 9 allows driving the adjustment shaft 5 at a faster and at a lower rotational speed than the rotation shaft 4 to thereby produce a relative i.e. differential rotation between the suspension rotor and the adjustment rotor. The aforementioned pivoting mechanism (not seen in FIG. 1) transforms such differential rotation into pivoting motion of the chute (not seen in FIG. 1).

Distribution devices with a differential driving system have proven very successful in industry. As will be understood however, proper operation of the gear components in the casing 1, in particular of the sun-and-planet gear train 8, requires high precision manufacturing of the casing 1. In fact the various rotation axes: axis A2 of the primary input shaft 2; axis A3 of the secondary input shaft 3, which coincides with the main axis of the planetary differential gear 8; the axes A4 and A5 of the first and second output shafts 4, 5 respectively; and the axis A7 of the reduction gear 7, all have to be parallel and spaced at the appropriate distance between them as precisely as possible to warrant minimal wear of the gears. Therefore, manufacture of the drive unit, especially due to high precision machining of the casing 1, tends to be relatively expensive in order to avoid any risk of premature wear, especially of the planetary differential mechanism 8, which is itself a heavy-duty and thus relatively costly component. Typical high-precision drilling operations as well as other high-precision manufacturing practices can however still introduce minor inaccuracies as regards the positioning and orientation of the bearings that define the various axes A2, A3, A4, A5 and A7 so that wear cannot be minimized in cost-optimal manner. Moreover, experience has shown that failure of the planetary differential mechanism 8, even though being rare is nevertheless one of the major sources of outage of the driving system.

BRIEF SUMMARY

In view of the foregoing, the invention provides a device for distributing charge material into a shaft furnace with a differential driving system the design of which renders requirements concerning manufacturing precision less stringent without increasing the risks of premature wear of the driving system components, in particular of the differential gear.

In a manner known per se, the proposed device for distributing charge material comprises a main housing, a distribution chute, a suspension rotor and an adjustment rotor. Both rotors are mounted in the main housing so as to be rotatable about a substantially vertical rotation axis, typically the furnace axis of the shaft furnace, and have a respective gear ring for driving the rotors. Furthermore, also in known manner, the distribution chute is suspended to the suspension rotor so as to rotate therewith for circumferential distribution of charge material whilst also being adjustable in orientation relative to the suspension rotor, in particular pivotally adjustable about a substantially horizontal pivoting axis. Adjustment for radial distribution of charge material is made by means of differential rotation of the adjustment rotor with respect to the suspension rotor. Accordingly, as one of its key components, the device has a differential mechanism, more specifically a differential gear, that interconnects the suspension rotor and the adjustment rotor so as to allow differential and, of course, synchronous rotation of the adjustment rotor relative to the suspension rotor. For actuating the rotors, the device includes, a main rotation drive, in particular an electric motor, connected to the suspension rotor for imparting rotation to the suspension rotor and an adjustment drive, in particular an electric motor, and for imparting differential rotation to the adjustment rotor.

The differential connects both drives, i.e. the rotation drive and the adjustment drive, to the adjustment rotor. More specifically, the differential is configured to synchronously rotate the adjustment rotor and the suspension rotor upon action of the rotation drive while enabling asynchronous rotation by action of the adjustment drive. In other words, the differential transmits to the adjustment rotor the same speed of rotation that is imparted to the suspension rotor by the main rotation drive, unless the adjustment drive imparts differential rotation in order to asynchronously rotate the adjustment rotor relative to the suspension rotor.

According to the present invention the device further comprises:
- a first gear casing arranged on the main housing and enclosing a gear mechanism connected to a first output shaft, i.e. the shaft that protrudes into the main housing where it is connected to a gearwheel that meshes with the gear ring of the suspension rotor;
- a second gear casing arranged on the main housing and enclosing the aforementioned differential gear, which is connected to a second output shaft, i.e. the shaft that protrudes into the main housing where it is connected to a gearwheel that meshes with the gear ring of the adjustment rotor; and
- a shaft arrangement equipped with a compensating coupling, also called yielding coupling, and connecting the differential gear in the second gear casing to the gear gear in the first gear casing.

The two separate gear casings forming independent fixed mounting frameworks enabling independent positioning and parallelism between two groups of gear components: namely those required for the differential gear, i.e. differential torque transmission from the main drive to the adjustment rotor, and those required for direct torque transmission from the main rotation drive to the suspension rotor. Accordingly, the second casing need only contain those shafts, and thus properly locate and orientate the minimum axes necessary by definition for the differential gear plus a single axis for connecting the shaft arrangement to the differential gear, thus reducing potential sources of misalignment or positioning mismatch that could affect durability of the differential. The proposed design excludes that any minor anti-parallelism or positioning inaccuracy between the first and second output shafts (on the side of the rotors) and between the first and second input shafts (on the side of the drives) respectively, could increase wear-off. As will be appreciated, the proposed configuration excludes in particular that either such anti-parallelism or positioning inaccuracy could reduce the service-life of the differential.

As is well known, a compensating coupling—also called a yielding coupling—is a coupling that has means for permitting movement or permanent mismatch between the parts it connects during the transmission of torque between the parts. In the present context, the expression compensating coupling is meant to include flexible couplings as well as couplings based on universal joints, both well known e.g. from the manual "Mechanical Design of Machine Elements and Machines" by J. A. Collins et al (authors) John Wiley and Sons (Publisher: ISBN 9780470413036). Accordingly, by virtue of the compensating coupling i.e. a coupling configured to compensate radial, axial and/or angular mismatch between the shafts it connects, additional tolerance regarding misalignment and improper positioning between the two aforementioned groups of gear components is created while transmitting torque. In principle, any suitable type of compensating coupling (in German: "Ausgleichskupplung" or "bewegliche Kupplung") may be used to this effect, in particular a torsionally rigid but radially, axially and/or angularly flexible coupling. Examples are bushed-pin type coupling; a universal coupling such as a Cardan coupling; an Oldham coupling; a bellows coupling; a jaw coupling; an electromagnetic coupling; etc. The coupling is of a type that is non-detachable during operation, i.e. a "permanent coupling" as opposed to a clutch. In other words, the coupling cannot be disengaged when torque is transmitted, which is beneficial for system safety and reliability. Particularly preferred examples of torsionally rigid flexible couplings are flexible disc couplings (in German: "Federscheibenkupplung") or gear couplings, in particular gear couplings with curved teeth (in German: "Bogenzahnkupplung"). Preferably, a radially, axially and angularly flexible coupling is used, i.e. a coupling that provides tolerance as regards all three kinds of mismatch.

In order to facilitate construction, the shaft arrangement comprises a first connecting shaft connected to the gear mechanism and protruding laterally from the first gear casing and a second connecting shaft connected to the differential gear and protruding laterally from the second gear casing. To facilitate maintenance, the compensating coupling is advantageously arranged in between the first gear casing and the second gear casing to connect the first connecting shaft to the second connecting shaft. In combination with the latter measures, the connecting shafts may each be rotatably supported by the respective gear casing through a pair of roller bearings mounted to a sidewall of the casing.

Whenever placement and orientation of the separate casings is non-critical, the connecting shafts between the casings can be substantially aligned and, in this case, the compensating coupling may be a cost-effective Oldham coupling or a jaw coupling, which provides sufficient tolerance. When further flexibility concerning placement and orientation of the separate casings is desired however, the compensating coupling is preferably a homokinetic universal joint arrangement, in particular a dual Cardan shaft comprising two Cardan joints ensuring homokinetic transmission. More preferably, a dual Cardan shaft with length compensation, e.g. a dual Cardan shaft length-extensible intermediate shaft, is used to provide further positioning tolerance. To facilitate construction and to avoid additional requirements concerning installation of the dual Cadan shaft, each of the two Cardan joints is preferably a centered double Cardan joint.

Whereas the main rotation drive and the adjustment drive could both be arranged otherwise, e.g. both on the second gear casing, in a preferred embodiment, the main rotation drive is supported by the first gear casing. The main drive is in that case connected through the gear mechanism to the first output shaft for rotating the suspension rotor whilst it is further connected by means of the gear mechanism, the shaft arrangement and by means of the differential gear to the second output shaft for synchronously rotating the adjustment rotor. Consequently, the adjustment drive is supported by the other, i.e. the second gear casing and connected through the differential gear to the second output shaft for imparting differential i.e. asynchronous rotation to the adjustment rotor relative to the suspension rotor.

The shaft arrangement may be connected to the gear mechanism in the first casing and to the differential gear in the separate second casing e.g. by means of respective pairs of bevel gears. The respective output shafts for the suspension rotor and the adjustment rotor can be supported in the first and second casings respectively by means of a pair of axially spaced roller bearings.

In a configuration that has proven practical in practice, the differential comprises an epicyclic sun-and-planet gear train, preferably with a sun gear connected to the adjustment drive, with a planet gear carrier fixed to the second output shaft and annulus, which is connected through the shaft arrangement with the compensating coupling to the main rotation drive in the first casing. While other embodiments are not excluded, the driving system typically comprises a pivoting device connecting the distribution chute to the adjustment rotor. The pivoting device is preferably configured to transform a differential rotation of the adjustment rotor relative to the suspension rotor into a variation of the pivotal position of the chute about a substantially horizontal pivoting axis for adjusting the angle of inclination of the chute relative to the suspension rotor.

As will be understood, the present invention is industrially applicable particularly for equipping or upgrading a shaft furnace charging installation, especially a blast furnace top charging installation arranged.

BRIEF DESCRIPTION OF THE DRAWINGS

Further details and advantages of the present invention will be apparent from the following detailed description of several not limiting embodiments with reference to the attached drawings, wherein.

In these drawings, identical reference signs identify identical or similar parts, while reference signs with incremented hundreds digit identify functionally similar parts in a structurally different embodiment.

DETAILED DESCRIPTION

Figure 1:
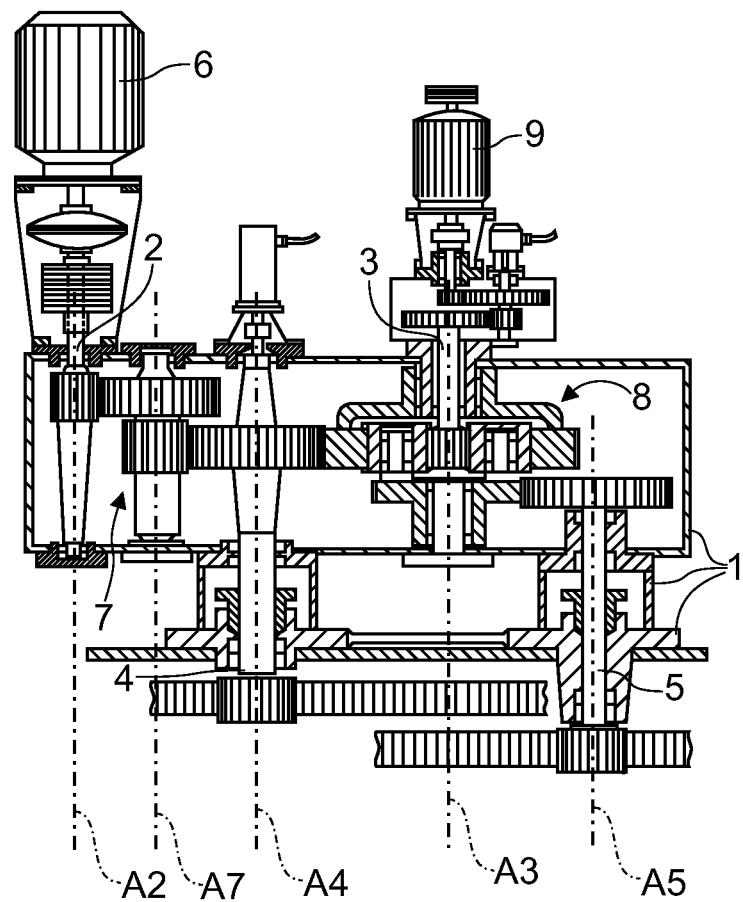
FIG. 1 is a vertical cross-sectional view of a prior art compact drive unit according to U.S. Pat. No. 3,693,812, of a device for distributing charge material into a shaft furnace.
Figure 2:
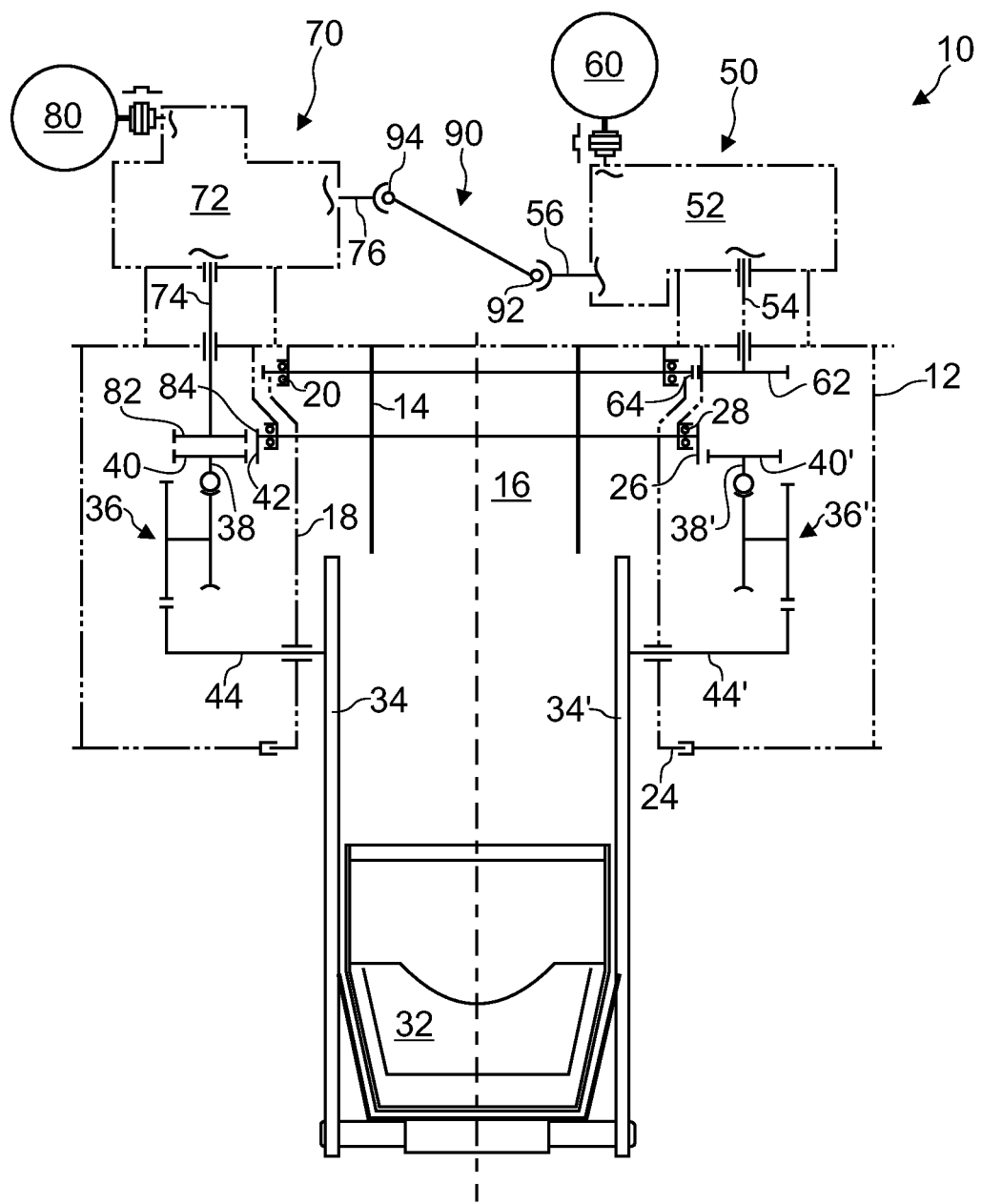
FIG. 2 is a schematic vertical cross-sectional view illustrating a distribution device equipped with a first embodiment of a drive system.

FIG. 2 illustrates a device 10 for distributing bulk charge material ("burden") into a shaft furnace, especially onto the stockline of a blast furnace. The device 10 is designed to be part of a charging installation, which is not shown in its entirety. It comprises a main housing 12 to be arranged on the furnace throat and which includes a fixed feeding spout 14 that defines a vertical feeding channel 16. A suspension rotor 18 is suspended inside the main housing 12 by means of a first large-diameter annular roller bearing 20 to be rotatable about a substantially vertical rotation axis. The suspension rotor 18 comprises a generally cylindrical body provided at its lower in with a disk-shaped horizontal protection flange 24, which forms a screen between the interior of the main housing 12 and the interior of the furnace. A second rotor, hereinafter called adjustment rotor 26, surrounds the suspension rotor 18 and is suspended inside the main housing 12 by means of a second large-diameter annular roller bearing 28, which is arranged so that the axis of rotation of the adjustment rotor 26 is substantially coaxial to the axis of rotation of the suspension rotor 18.

Reference sign 32 identifies a distribution chute for bulk material fed through the feeding channel 16. The chute 32 has two lateral suspension arms 34, 34' by means of which it is suspended to the suspension rotor 18. A pivoting device that is actuated by the adjustment rotor 26 allows adjusting the orientation of the chute 32 relative to the suspension rotor 18, more specifically the pivotal position or tilting angle of the chute about an axis that is substantially horizontal. To this effect, the pivoting device connects the distribution chute 32 to the adjustment rotor 26 to transform a differential rotation of the adjustment rotor 26 into a variation of the pivotal position of the chute 32. In the illustrated device 10, the pivoting device comprises, for each suspension arm 34, 34' of the chute 32, a pivoting mechanism 36, 36', which are carried at diametrically opposite locations on and by the suspension rotor 18. Each of the pivoting mechanisms 36, 36' has a respective vertical input shaft 38, 38', an internal gear system and a horizontal suspension trunnion 44, 44'. The input shafts 38, 38' are parallel to the rotation axes of both rotors 18, 26 and connected to a respective gearwheel 40, 40' that meshes with a lower gear ring 42 of the adjustment rotor 26. Each gear system transforms rotation of the respective input shaft 38, 38' into rotation of the respective suspension trunnion 44, 44'. As will be noted, both pivoting mechanisms 36, 36' are symmetrical with respect to a center plane of the chute 32, that is to say, rotation of the input shafts 38, 38' by the lower gear ring 42 of the adjustment rotor 26 results in a rotation in opposite senses (seen from the median plane) of both suspension trunnions 44, 44' to pivot the chute 32. As seen in FIG. 2, the lateral suspension arms 34, 34' are mounted to the trunnions 44, 44' so that they define a substantially horizontal pivoting axis for the chute 32.

As will be understood, the present invention is not limited in application to a pivoting mechanism as set out above. The present invention can be put into practice with various other adjustment mechanisms for adjusting the position of the chute 32 relative to the suspension rotor 18. For instance, U.S. Pat. No. 4,941,792 discloses a pivoting mechanism with a forked pivoting lever connecting two suspension trunnions to the adjustment rotor 26, respectively an annular toothed segment that cooperates with an toothed sector fixed to either of the two chute trunnions. U.S. Pat. No. 5,002,806 on the other hand proposes connecting the adjustment rotor 26 to a crank on one of the chute trunnions by means of a rod linkage with spherical joints. Whereas the above adjustment mechanisms are designed to transform a differential rotation of the adjustment rotor 26 relative to the suspension rotor 18 into a variation of the tilt angle of the chute 32, other possibilities of adjustment are not excluded. In a further alternative, the chute is not a pivotable chute, but a sort of two-piece chute having an upper part, which is formed by and rotates in unison with the suspension rotor about the furnace central axis, and a lower chute part, which rotates about a second vertical rotation axis that is laterally offset from the central axis. Examples of such distribution devices and corresponding adjustment mechanisms for actuating the offset lower chute part are disclosed in Japanese patent application Nos. JP 63 096205 or JP 02 022409 or in Soviet Union Inventor's Certificate SU 1669988.

In FIG. 2, reference sign 50 identifies a first gear casing that is arranged on top of the main housing 12. The first gear casing 50 encases a gear mechanism 52 and provides the latter with a fixed framework. The gear mechanism 52 is connected to a substantially vertical first output shaft 54 that protrudes from the gear casing 50 down into the main housing 12. The gear mechanism 52 connects the first output shaft 54 to a horizontal first connecting shaft 56 that protrudes laterally from the first gear casing 50 at a right angle with respect to the output shaft 54. Furthermore, the gear mechanism 52 connects the output shaft 54 to a main rotation drive 60, preferably an electric motor—while other drives, such as hydraulic or pneumatic drives are not excluded—that is supported on the first casing 50. The lower end of the output shaft 54 is provided with a gearwheel 62 that meshes with a first gear ring 64 on the suspension rotor 18. Accordingly, the output shaft 54 acts as rotation drive shaft to transmit torque from the main rotation drive 60, through the gear mechanism 52, to the suspension rotor 18.

In FIG. 2, reference sign 70 identifies a separate second gear casing that is arranged on top of the main housing 12. This second gear casing 70 encloses a differential mechanism, in particular a differential gear 72, and forms the fixed framework thereof. The differential gear 72 (hereinafter: differential 72) connects a substantially vertical second output shaft 74 to a substantially horizontal second connecting shaft 76, which protrudes laterally from the second gear casing 70, on the side of the first gear casing 50. Furthermore, the differential connects the second output shaft 74 to an adjustment drive 80 that is supported separately on second gear casing 70. As will be understood, the second output shaft 74, which protrudes from the second gear casing 70 into the main housing 12, is supported by the second casing 70 and thus independently of the first output shaft 54. The lower end of the output shaft 74 carries a gearwheel 82 that meshes with a second gear ring 84 that is fixed to an upper region of the adjustment rotor 26, above the lower gear ring 42. Accordingly, the adjustment drive 80 is connected through the differential 72 to the adjustment rotor 26 to impart differential rotation to the latter.

As further shown in FIG. 2, a shaft arrangement 90 connects the differential 72 located inside the second gear casing 70 to the gear mechanism 52 located inside the first gear casing 50. As will be appreciated, the shaft arrangement 90 is equipped with a suitable type of compensating coupling configured compensate radial, axial and angular mismatch between the first connecting shaft 56 and the second connecting shaft 76. For instance, in the embodiment schematically illustrated in FIG. 2, the shaft arrangement 90 comprises a homokinetic universal joint arrangement, in particular a double (dual) Cardan shaft with two Cardan joints 92, 94, to form a compensating coupling, while any other suitable type of, preferably torsionally rigid, compensating coupling may be used.

Figure 3:
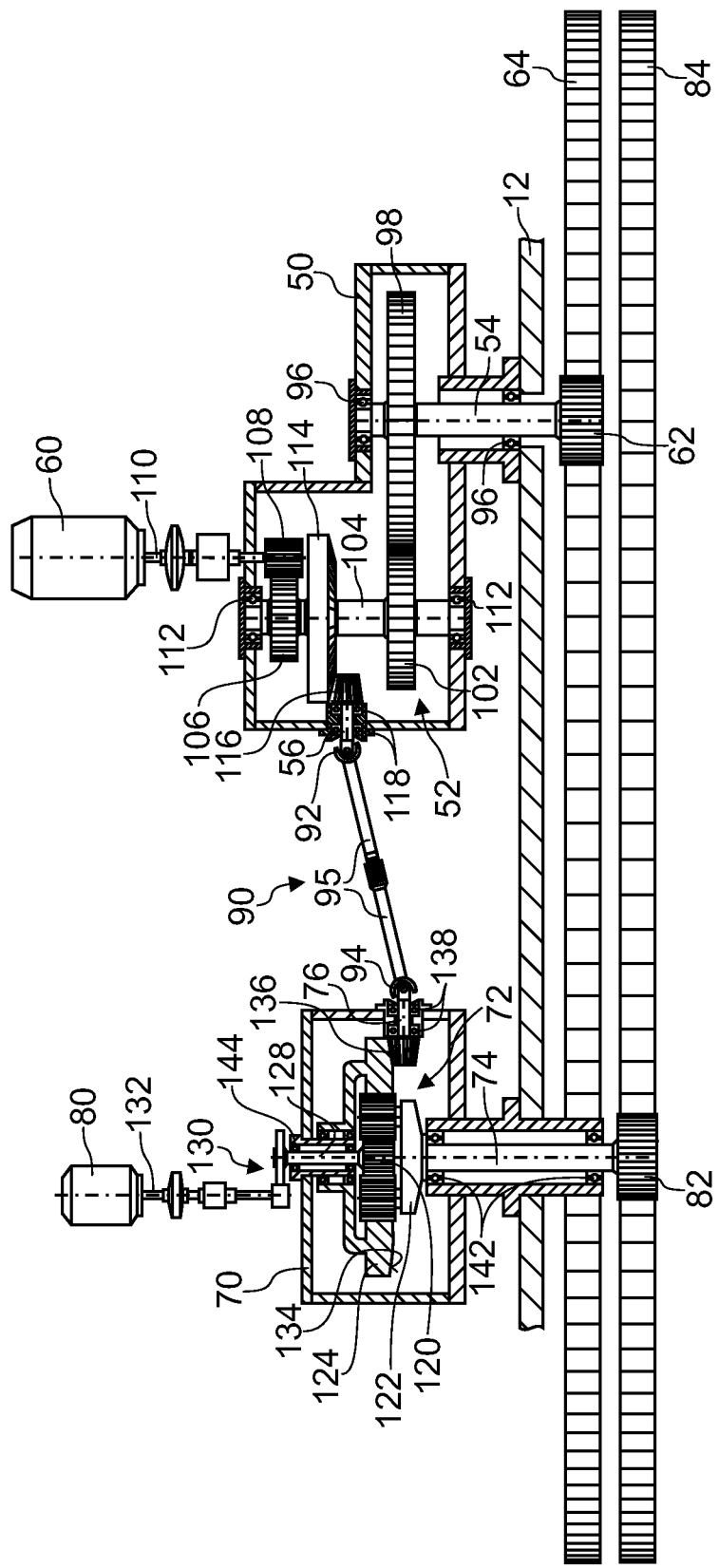
FIG. 3 is an enlarged partial cross-sectional view showing the drive system of FIG. 2 in more detail.

FIG. 3 shows the drive system of FIG. 2 in more detail. The first output shaft 54 is supported by the first gear casing 50 by means of a pair of axially spaced roller bearings 96 mounted into bores in the first casing 50. The first output shaft 54 carries a large diameter gearwheel 98 that meshes with a lower smaller diameter gearwheel 102 carried by an auxiliary shaft 104. The auxiliary shaft 104 carries an upper small diameter gearwheel 106 that meshes with a drive gearwheel 108 on the drive shaft 110 of the main drive motor 60. The auxiliary shaft 104 is also supported by the first casing 50 by means of a pair of axially spaced roller bearings 112. The gear mechanism 52 in the first casing 50 further comprises a bevel gear pair connecting the auxiliary shaft 104 to the first connection shaft 56 of the shaft arrangement 90. The bevel gear pair is formed by a large-diameter first bevel gear 114 fixed to the auxiliary shaft 104 and a second bevel gear 116 that is fixed to the connecting shaft 56 and meshes with the first bevel gear 114. As further seen in FIG. 3, the first connecting shaft 56 is rotatably supported through a pair of roller bearings 118 mounted into a bore in the sidewall of the first casing 50 that is generally facing the second casing 70. The first casing 50 thus encases a gear mechanism 52 that connects the main rotation drive 60, on the one hand, to the first gear ring on the suspension rotor 18 for imparting rotation to the chute 32 and on the other hand to the shaft arrangement 90, which provides a connection of the main rotation drive 60 to the differential 72 as will be detailed below.

As further seen in FIG. 3, the second gear casing 70 encases the differential 72, which is more specifically an epicyclic sun-and-planet gear mechanism (also called "planetary gear"). The planetary differential 72 thus comprises, in a manner known per se, a sun gear 120, a planet gear carrier 122 and an annulus 124. The planet gear carrier 122 carries at least two planet gears that mesh with the sun gear 120 and with an internal gearing of the annulus 124 to revolve about the common central axis of the sun gear 120 and the annulus 124 to drive the planet gear carrier 122. The sun gear 120 is fixed to an auxiliary shaft 128 that is driven by the adjustment motor 80 via reduction gear 130, which is only schematically shown in FIG. 3, and connects the drive shaft 132 of the adjustment motor 80 to the auxiliary shaft 128. As further seen in FIG. 3, the planet gear carrier 122 is fixed to the upper end of the second output shaft 74. The annulus 124 in turn is provided with a peripheral bevel gearing 134 that meshes with a bevel gear 136 fixed to the second connecting shaft 76 to form a bevel gear pair connecting the shaft arrangement 90, and thus the main rotation drive 60, to the epicyclic sun-and-planet gear mechanism 72. Similarly to the first connecting shaft 56 of the first casing 50, the second connecting shaft 76 is rotatably supported by the second casing 70 through a pair of roller bearings 138 that are mounted to a sidewall of the second casing 70, which generally faces the first casing 50. As shown in FIG. 3, the second output shaft 74 is rotatably supported by the separate second gear casing 70 via a pair of axially spaced roller bearings 142 mounted into bores in the second casing 70. The auxiliary shaft 128 is supported by roller bearings mounted inside a bushing 144 that is mounted into a bore in the second casing 70. The second casing 70 also supports the annulus by a pair of roller bearings mounted outwardly on the bushing 144.

The differential sun-and-planet gear mechanism 72 in the second gear casing 70 is dimensioned so that the rotational speed N1 of the first output shaft 54, imparted by the main rotation drive 60 via the gear mechanism 52, and the rotational speed N2 of the second output shaft 74 are equal, whenever the auxiliary shaft 128, i.e. the drive shaft of the adjustment drive 80 does not rotate, i.e. when the latter is at standstill (N3=0). In other words, the differential 72 is configured to transmit to the adjustment rotor 26 the same speed of rotation that is imparted to the suspension rotor 18 by the main rotation drive 60, unless the adjustment drive 80 imparts differential rotation to the adjustment rotor 26 relative to the suspension rotor 18. Accordingly, when the adjustment drive 80 is operated to rotate the auxiliary shaft 128 at a rotational speed N3 (≠0) in a first sense, the rotational speed N2 of the second output shaft 74 will correspond to the addition of the rotational speed N1 of the first output shaft 54 and the rotational speed N3 of the auxiliary shaft 128 multiplied by an appropriate gear ratio (which depends on the design of the differential sun-and-planet gear mechanism 72). On the other hand, when the adjustment drive 80 rotates the auxiliary shaft 128 at a rotational speed N3 (≠0) in the opposite sense, the rotational speed N2 of the second output shaft 74 will correspond to the rotational speed N1 of the first output shaft 54 reduced by (subtracting) the rotational speed N3 multiplied by the appropriate gear ratio. It follows that, by operating the adjustment drive 80 as desired, the differential sun-and-planet gear mechanism 72 allows increasing, reducing or eliminating an angular displacement between the suspension rotor 18 and the adjustment rotor 26. Accordingly, the differential 72 interconnects the suspension rotor 18 and the adjustment rotor 26 in a manner that allows differential rotation of the former relative to the latter. On the other hand, the differential 72 allows maintaining both rotors 18, 26 at the same speed of rotation without operation of the adjustment drive 80, i.e. when the latter is at rest. Any suitable adjustment mechanism as described above then transforms variations in angular displacement between the suspension rotor 18 and the adjustment rotor 26 into corresponding variation of the position of the chute 32, in particular the pivoting position/ tilting angle in case of FIG. 2. As will be understood, the rotational speed of the adjustment drive 80 determines the adjusting, i.e. pivoting speed of the chute 32. When the chute 32 is to be maintained in position (relative to the suspension rotor 18), it suffices to stop the adjustment drive 80. Breaking of the adjustment drive 80 can be achieved electrically. After stop (rest) of the adjustment drive 80, the latter may be blocked in rotation mechanically, e.g. by means of a self-blocking configuration of the reduction gear 130. In the above functional description, it is assumed that the gear ratio between the first gear ring 64 and the gearwheel 62 is identical to the gear ratio between the second gear ring 84 and the gearwheel 82. In case the latter gear ratios differ, the internal gear ratios of the differential sun-and-planet gear mechanism 72 are adapted accordingly to achieve synchronous rotation of the rotors 18, 26 by sole action of the main rotation drive 60 and to permit differential rotation there between by action of the auxiliary drive 80.

As will be understood, the shaft arrangement 90 provides the mechanical connection for transmitting torque from the first casing 50 to the second casing 70, more specifically from the main rotation drive 60, via the gear mechanism 52, to the differential 72 in the separate second casing 70 in order to achieve synchronous rotation of the suspension rotor 18 and the adjustment rotor 18. Besides the connecting shafts 56; 76, the shaft arrangement comprises a compensating coupling, e.g. a Cardan shaft as shown in FIG. 3, in order to provide additional tolerance regarding potential inaccuracy in alignment and in positioning between the shafts 74, 128 of the differential 72 on the one hand and the shafts 54, 104 of the gear mechanism 52 on the other hand, in particular between the first output shaft 54 and the second output shaft 74. Another advantage provided by the separate gear casings 50, 70 and the additional tolerance due to the compensating coupling resides in that the output shafts 54, 74 can be independently mounted parallel to the axis of rotation of the rotors 18, 26 for proper engagement between the gear 62, 82 and the associated ring gear 64, 84 respectively. In addition, the shaft arrangement 90 enables independent positioning of the first output shaft 54 with respect to the second output shaft 74 and of the main rotation drive 60 with respect to the adjustment drive 80 facilitate adapting to constraints of constructional space.

FIG. 3 shows a shaft arrangement 90 in which the compensating coupling is formed by a double Cardan shaft formed by the two Cardan joints 92, 94 and a length extensible intermediate shaft 95. The length extensible intermediate shaft 95 is a torsionally rigid two-piece shaft with a first and a second part telescopically connected by a positive fit connection, e.g. a profile-splined first part engaging a conjugated bore in the second part. Each of the respective Cardan joints 92, 94 is preferably a centered double Cardan joint that maintains homokinetic transmission irrespective of angular mismatch between the first connecting shaft 56 and the intermediate shaft 95 or between the second connecting shaft 56 and the intermediate shaft 95. Irrespective of the type of compensating coupling used, the coupling shall be torsionally rigid in order to ensure uniform torque transmission through the shaft arrangement 90.

Figure 4:
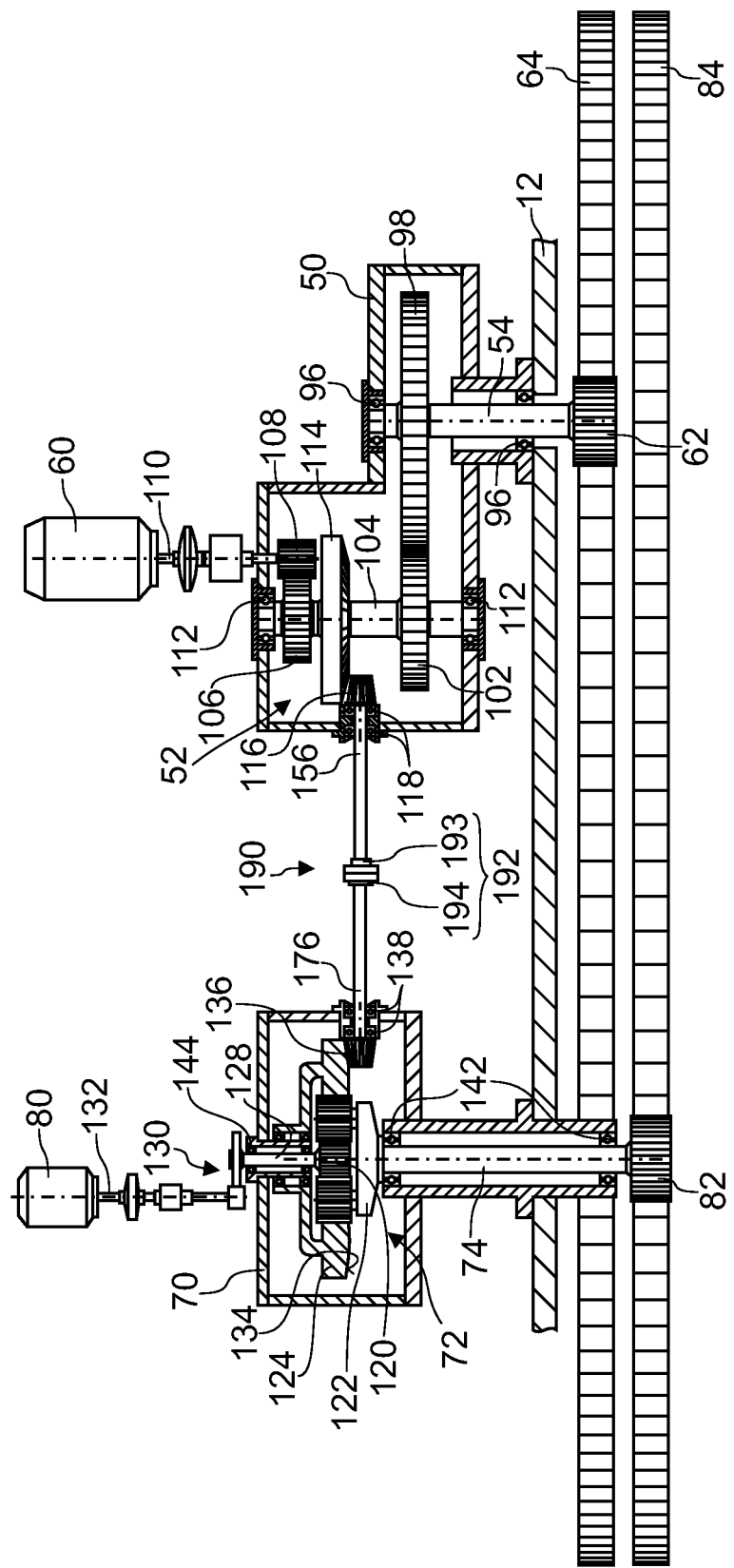
FIG. 4 is an enlarged partial cross-sectional view showing a second embodiment of a drive system for equipping a distribution device according to FIG. 2.

FIG. 4 shows an alternative drive system for use in a distribution device 10 according to FIG. 2. In FIG. 4, identical reference signs identify identical parts with respect to FIG. 3, the main difference lying in the use of a different shaft arrangement 190. In the embodiment of FIG. 4, the alternative shaft arrangement 190 comprises first and second connecting shafts 156, 176 that are substantially, though not necessarily exactly, coaxially arranged with respect to a horizontal axis. As further seen in FIG. 4, the shaft arrangement 190 comprises a less expensive, comparatively simpler compensating coupling 192, e.g. a jaw coupling or an Oldham coupling. Whereas an Oldham coupling can accommodate greater radial mismatch, a jaw coupling is considered fail-safe, since the hubs 193, 194 of a jaw coupling engage themselves in case of failure of the intermediate part. For either type of coupling, a respective coupling hub 193, 194 is provided on the adjacent ends of each connecting shaft 156, 176. Both coupling hubs 193, 194 engage a slightly resilient intermediate part (not illustrated in detail), typically called spider or middle disc, by means of positive locking engagement ("form-fit"). Whilst such simpler compensating couplings have lesser capabilities of compensating axial, angular and radial mismatch between the connecting shafts 156, 176, their capability is generally sufficient in view of typical manufacturing tolerances applicable to the gear casings 50, 70, whenever, as opposed to a universal joint arrangement of FIG. 3, no additional freedom of placement and orientation of the gear casings 50, 70 is necessary. Moreover, a compensating coupling 192 of the Oldham- or claw coupling type, even as it is chosen to be technically torsionally rigid and homokinetic, can provide a certain degree of damping between the two torque-transmitting paths for rotation and pivoting.

In a preferred variant of the invention (not illustrated in detail), the compensating coupling 192 is a torsionally stiff flexible coupling. Particularly preferred examples of flexible couplings are either a flexible disk coupling or a gear coupling. A flexible disk coupling comprises one or more elastic members such as disc-shaped lamellae or the like made of metal or synthetic material, typically of special steel. The elastic members, which are typically arranged radially to the coupling axis and shear-loaded, provide radial, axial and angular tolerance due to their flexibility. In a further preferred embodiment, the compensating coupling 192 may include two flexible disk couplings that are serially connected in the manner of a dual Cardan shaft. On the other hand, a flexible gear coupling comprises two mounting hubs with external gear teeth and a sleeve that fits over both hubs. The sleeve has internal teeth that engage the external teeth of the hubs. Use of a gear coupling with curved external teeth on the hubs is preferred for accommodating larger angular mismatch. While providing large angular mismatch tolerance, and usually sufficient axial mismatch tolerance, a gear coupling is typically less tolerant in terms of radial mismatch.

The invention claimed is:

1. A device for distributing charge material into a shaft furnace or a blast furnace, said device comprising:
a main housing;
a distribution chute for distributing charge material;
a suspension rotor mounted in said main housing so as to be rotatable about a substantially vertical rotation axis, said suspension rotor being provided with a first gear ring;
an adjustment rotor mounted in said main housing so as to be rotatable about a substantially vertical rotation axis, said adjustment rotor being provided with a second gear ring;
said distribution chute being suspended to said suspension rotor so as to rotate therewith for circumferential distribution of charge material and being adjustable in orientation relative to said suspension rotor through said adjustment rotor for radial distribution of charge material;
a differential gear interconnecting said suspension rotor and said adjustment rotor so as to allow differential rotation of the adjustment rotor relative to the suspension rotor;
a main rotation drive connected to said suspension rotor for imparting rotation to said suspension rotor and connected through said differential gear to said adjustment rotor for imparting rotation to said adjustment rotor;
an adjustment drive connected through said differential gear to said adjustment rotor for imparting differential rotation to said adjustment rotor relative to the suspension rotor;
said differential gear being configured to transmit to said adjustment rotor the same speed of rotation that is imparted to said suspension rotor by said main rotation drive unless said adjustment drive imparts, through said differential gear, differential rotation to said adjustment rotor relative to the suspension rotor;
wherein said device further comprises:
a first gear casing arranged on said main housing and enclosing a gear mechanism that connects said main rotation drive to a first output shaft that protrudes into said main housing where it is connected to a gearwheel that meshes with said first gear ring of said suspension rotor;
a second gear casing arranged on said main housing and enclosing said differential gear that connects said adjustment drive to a second output shaft that protrudes into said main housing where it is connected to a gearwheel that meshes with said second gear ring of said adjustment rotor; and
a shaft arrangement equipped with a compensating coupling and connecting said differential gear in said second gear casing to said gear mechanism in said first gear casing.

2. The device for distributing charge material according to claim 1, wherein said compensating coupling is a torsionally rigid flexible coupling.

3. The device for distributing charge material according to claim 2, wherein said flexible coupling is a flexible disk coupling.

4. The device for distributing charge material according to claim 2, wherein said flexible coupling is a gear coupling.

5. The device for distributing charge material according to claim 1, wherein said shaft arrangement comprises a first connecting shaft connected to said gear mechanism and protruding laterally from said first gear casing and a second connecting shaft connected to said differential gear and protruding laterally from said second gear casing, and a compensating coupling arranged in between said first gear casing and said second gear casing to connect said first connecting shaft to said second connecting shaft.

6. The device for distributing charge material according to claim 5, wherein said first connecting shaft is rotatably supported by said first gear casing through a pair of roller bearings mounted to a sidewall of said first gear casing; and
said second connecting shaft is rotatably supported by said second gear casing through a pair of roller bearings mounted to a sidewall of said second gear casing.

7. The device for distributing charge material according to claim 5, wherein said first connecting shaft and said second connecting shaft are substantially aligned and said compensating coupling is an Oldham coupling or a jaw coupling.

8. The device for distributing charge material according to claim 1, wherein said compensating coupling is a homokinetic universal joint arrangement.

9. The device for distributing charge material according to claim 8, wherein said compensating coupling is a double Cardan shaft comprising two Cardan joints and a length-extensible intermediate shaft that interconnects said two Cardan joints, wherein each of said two Cardan joints is a double Cardan joint.

10. The device for distributing charge material according to claim 1, wherein
said main rotation drive is supported by said first gear casing; and
said adjustment drive is supported by said second gear casing.

11. The device for distributing charge material according to claim 1, wherein
said first gear casing comprises a roller bearing arrangement that supports said first output shaft so that said first output shaft protrudes from said first gear casing into said main housing; and
said second gear casing comprises a roller bearing arrangement that supports said second output shaft independently of said first output shaft and so that said second output shaft protrudes from said second gear casing into said main housing.

12. The device for distributing charge material according to claim 1, wherein said differential gear comprises an epicyclic sun-and-planet gear train that comprises an annulus, a sun gear and a planet gear carrier carrying at least two planet gears that mesh with said annulus and said sun gear.

13. The device for distributing charge material according to claim 12, wherein said sun gear is connected to said adjustment drive;
said planet gear carrier is fixed to said second output shaft, and
said annulus is connected, through said shaft arrangement with said compensating coupling and through said gear mechanism in said first gear casing to said main rotation drive.

14. The device for distributing charge material according to claim 1, wherein
said first output shaft is rotatably supported by said first gear casing through a pair of axially spaced roller bearings mounted into bores in said first gear casing; and protrudes from said first gear casing into said main housing; and wherein said second output shaft is rotatably supported by said second gear casing through a pair of axially spaced roller bearings mounted into bores in said second gear casing, and protrudes from said second gear casing into said main housing.

15. The device for distributing charge material according to claim 1, further comprising a pivoting device connecting said distribution chute to said adjustment rotor, said pivoting device being configured to transform a differential rotation of said adjustment rotor relative to said suspension rotor into a variation of the pivotal position of said chute about a substantially horizontal pivoting axis for adjusting the angle of inclination of said chute relative to said suspension rotor.

16. Blast furnace charging installation comprising a device for distributing charge material according to claim 1.

17. Blast furnace comprising a charging installation according to claim 16.

18. The device for distributing charge material according to claim 6, wherein said first connecting shaft and said second connecting shaft are substantially aligned and said compensating coupling is an Oldham coupling or a jaw coupling.

19. The device for distributing charge material according to claim 2, wherein said flexible coupling is a gear coupling including curved external gear teeth.

20. The device for distributing charge material according to claim 1, wherein said compensating coupling is a double Cardan shaft comprising two Cardan joints with length compensation.

* * * * *